United States Patent [19]

Chana

[11] Patent Number: 4,727,968
[45] Date of Patent: Mar. 1, 1988

[54] SYNCHRONIZER CLUTCH ASSEMBLY

[75] Inventor: Howard E. Chana, Troy, Mich.

[73] Assignee: General Motors Corporation, Detroit, Mich.

[21] Appl. No.: 918,323

[22] Filed: Oct. 14, 1986

[51] Int. Cl.⁴ ............................................. F16D 23/02
[52] U.S. Cl. .................................... 192/53 F; 192/108
[58] Field of Search ............... 192/53 F, 114 T, 67 A, 192/108, 53 G

[56] References Cited

U.S. PATENT DOCUMENTS

| 2,981,390 | 4/1961 | Doerper | 192/53 F X |
| 3,110,191 | 11/1963 | Schulze | 192/108 X |
| 3,334,715 | 8/1967 | Bibbens | 192/114 T X |
| 4,189,041 | 2/1980 | Muller | 192/53 F |

FOREIGN PATENT DOCUMENTS

| 845903 | 8/1952 | Fed. Rep. of Germany | 192/53 F |
| 2411516 | 9/1975 | Fed. Rep. of Germany | 192/53 F |
| 1000494 | 8/1965 | United Kingdom | 192/53 F |

Primary Examiner—Rodney H. Bonck
Attorney, Agent, or Firm—Donald F. Scherer

[57] ABSTRACT

A synchronizer clutch assembly incorporates spline teeth on both a sleeve and a ratio gear. The sleeve is slidably disposed on a hub which is rotatably secured to a shaft member. The sleeve is moved longitudinally so that the spline teeth thereon intermesh with the spline teeth on the ratio gear to provide a drive connection therebetween. The spline teeth on the sleeve have a locking angle portion to prevent the inadvertent disengagement of the spline teeth and a flat portion to prevent fore and aft movement of the ratio gear from being transmitted via the spline teeth to the sleeve.

2 Claims, 5 Drawing Figures

SYNCHRONIZER CLUTCH ASSEMBLY

BACKGROUND OF THE INVENTION

This invention relates to mechanical clutches and more particularly to synchronized type mechanical clutches.

In prior art synchronizers, the spline teeth on the sleeve member and on the ratio or speed gear member include oblique surfaces which cooperate during engagement of the clutch to prevent inadvertent disengagement and to limit the longitudinal movement of the ratio gear relative to the sleeve member. The surfaces preventing inadvertent disengagement are designed to have a surface which angles relative to the longitudinal axis. The arctangent of the angle of inclination is generally equal to or greater than the coefficient of friction of the mating members. Thus, when a driving relationship is occurring between these surfaces, the frictional forces preventing longitudinal movement are greater than the component of the drive force seeking to separate the members.

The conventional synchronizer also has an oblique surface on the spline teeth which limits the longitudinal movement in the engage direction. The combination of these surfaces prevents relative longitudinal movement between the sleeve member and the ratio gear. During power transmission, however, the ratio gear is subjected to torque reversals and due to these torque reversals and the helix angle on the ratio gear, fore and aft movement of the ratio gear occurs. This fore and aft movement of the ratio gear is transmitted through the synchronizer sleeve to the manual shift control lever in the operator compartment of the vehicle.

SUMMARY OF THE INVENTION

The present invention prevents the fore and aft longitudinal movement of the ratio gear from being transmitted to the spline member by providing for lost motion therebetween through the incorporation of a flat surface formed on the spline teeth of the sleeve member. This flat surface separates the engagement limiting surface and the locking angle surface. Thus, during normal operation under which torque reversals are imposed on the ratio gear, the fore and aft movement of the ratio gear will result in movement of the ratio gear spline teeth along the flat surface of the sleeve spline teeth such that no movement can be transmitted therebetween.

It is therefore an object of this invention to provide an improved synchronizer clutch assembly having spline teeth on a ratio gear and a sleeve member, which teeth are intermeshed during clutch engagement and have formed thereon oblique surfaces which cooperate frictionally to prevent disengagement of the clutch and to limit relative axial movement and also wherein the teeth on the sleeve have a flat surface which permits the ratio gear to have limited fore and aft movement without corresponding movement by the sleeve member.

It is another object of this invention to provide an improved synchronizer clutch assembly wherein a ratio gear and a synchronizer sleeve each have formed thereon a plurality of spline teeth having opposed diverging oblique surfaces and opposed converging oblique surfaces which are intermeshed during engagement with the converging surfaces preventing inadvertent disengagement, and the diverging surfaces limiting axial movement in the engaging direction and further wherein a flat surface is disposed on the spline teeth of the sleeve member intermediate the diverging and converging surfaces to provide limited axial movement of the ratio gear relative to the sleeve member while the clutch is engaged.

These and other objects and advantages of the present invention will be more apparent from the following description and drawings.

DETAILED DESCRIPTION OF THE PREFERRED EMBODIMENT

Figure 1:
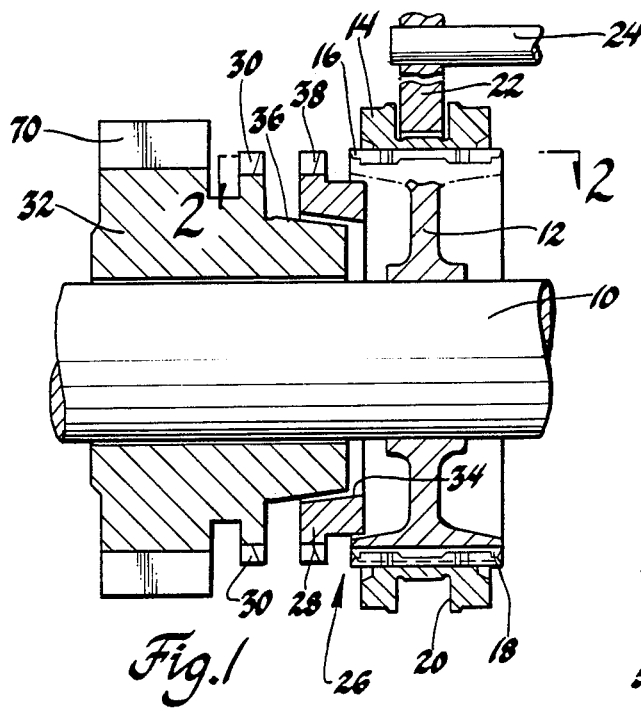
FIG. 1 is a cross-sectional elevational view of a synchronizer clutch assembly incorporating the present invention.
Figure 2:
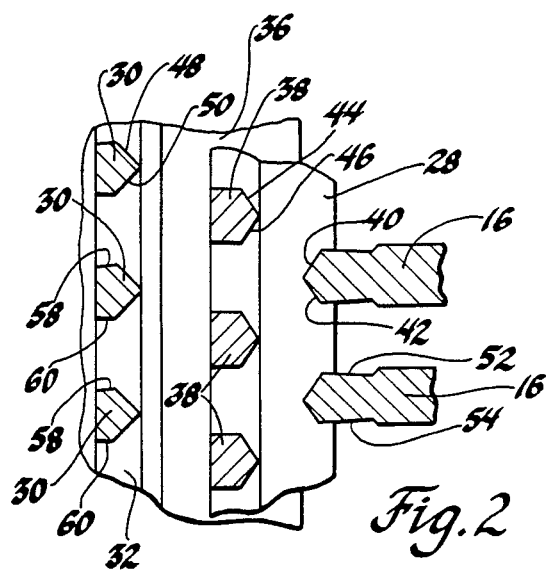
FIG. 2 is a view taken along line 2—2 of FIG. 1.

Referring to the drawings, there is seen in FIG. 1, a shaft member 10 having a hub 12 drivingly connected thereto. A sleeve member 14 is slidably disposed on the hub 12. The sleeve 14 has a plurality of spline teeth 16 which mesh with a plurality of spline teeth 18 formed on the hub 12. This intermeshing relationship is well-known in the synchronizer clutch art. The sleeve 14 is generally positioned centrally on the hub 12 by conventional detent members, not shown. The outer surface of the sleeve 14 has an annular groove 20 formed therein. This groove 20 cooperates with a shift yoke 22 which is manually manipulated through a rod 24 by a conventional operator shift mechanism, not shown. The yoke 22 and rod 24 are moved longitudinally such that the sleeve member 14 is moved longitudinally relative to the hub 12.

The hub 12 and sleeve 14 are members of a synchronizer clutch, generally designated 26, and further incorporating a blocker ring 28 and a plurality of spline teeth 30 which are formed on a ratio or speed gear 32 which is rotatably disposed on the shaft 10. The blocker ring 28 has a frusto-conical surface 34 which is adapted to engage a frusto-conical surface 36 formed on the ratio gear 32. The frictional clutching engagement of these surfaces occurs during lateral movement of the sleeve 14 toward the ratio gear 32. The blocker ring 28 has formed thereon a plurality of blocker teeth 38 which must be aligned between the spline teeth 16 formed on the sleeve 14 prior to the teeth 16 being moved into meshing relation with the spline teeth 30. Since the operation of synchronizers is well-known, only a brief description of the synchronizing action will be given.

Longitudinal movement of the sleeve 14 in the direction of the ratio gear 32 initially causes the surface 34 of blocker ring 28 to engage the frusto-conical surface 36 of the ratio gear 32. Engagement of these two surfaces is a clutching action which causes the ratio gear 32 to be speed synchronized with the shaft 10. Until speed synchronization occurs, the blocker ring 28 is a torque transmitting member which prevents the alignment of the teeth 38 with the surfaces between the teeth 16. However, when speed synchronization is attained, the blocker ring 28 discontinues any torque transmission and effectively disconnects the clutching action between the frusto-conical surfaces and is therefore free to rotate slightly relative to the spline teeth 16.

Figure 3:
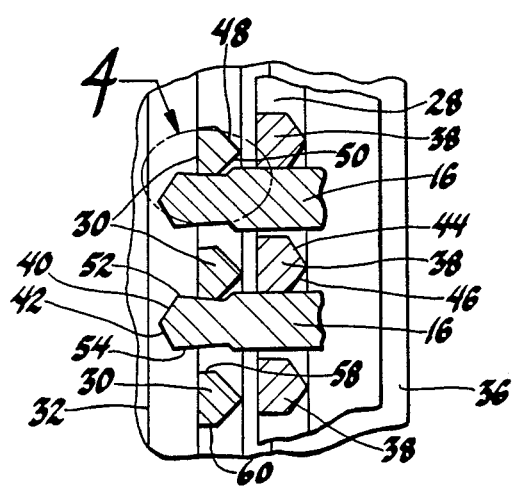
FIG. 3 is a view similar to FIG. 2 showing the clutch in the engaged condition.
Figure 4:
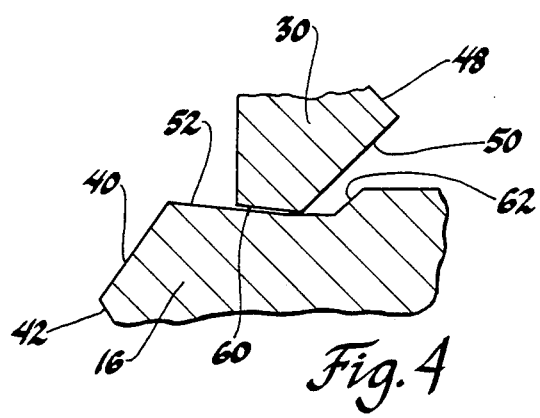
FIG. 4 is an enlarged view of the teeth shown in FIG. 3.
Figure 5:
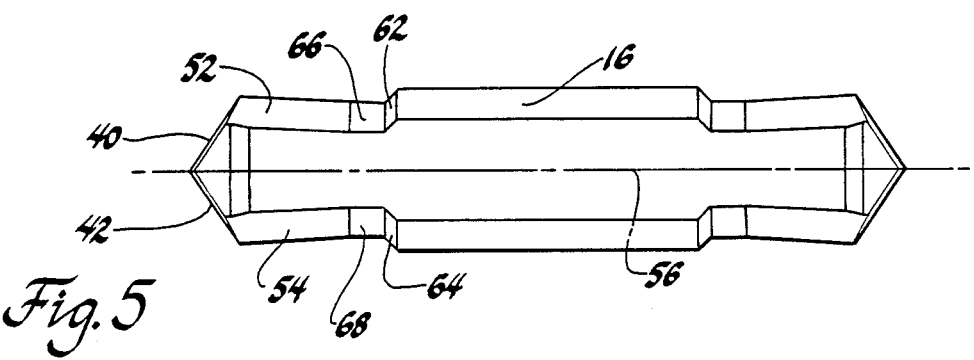
FIG. 5 is a plan view of a spline tooth.

The spline teeth 16 have leading diverging surfaces 40 and 42 which cooperate with diverging surfaces 44 and 46, respectively, on the teeth 38 to cause alignment of the teeth 38 with the spaces between the teeth 16. When this occurs, the teeth 16 will pass between the teeth 38 into meshing engagement as shown in FIG. 3 with the teeth 30. The teeth 30 also have leading diverging surfaces 48 and 50 which will cooperate with the surfaces 40 and 42, respectively, to assist in the intermeshing of the teeth as desired.

The spline teeth 16 have converging oblique surfaces 52 and 54. These surfaces have an angular relationship with the longitudinal axis 56 of the respective spline teeth. This angular displacement is generally termed the locking angle. A pair of converging surfaces 58 and 60 are formed on the ratio gear spline teeth 30. These converging surfaces have the same angular displacement as the surfaces 52 and 54.

The arctangent of the angle of these surfaces is generally equal to or greater than the coefficient of friction between the two surfaces. As is well-known, this frictionally retards separation of the spline teeth during torque transmission between the sleeve 14 and the ratio gear 32.

The spline teeth 16 also have a pair of trailing diverging surfaces 62 and 64 which cooperate with the diverging surfaces 50 and 48, respectively, to limit the longitudinal movement of the sleeve 14 in the clutch engaging direction. In the alternative, the longitudinal movement of the sleeve can be limited by other components such as the shift linkage, or a stop surface on the ratio gear. These structures are well-known to the skilled artisan or designer. Each of the spline teeth 16 also has a flat surface 66 intermediate the converging surface 52 and diverging surface 62 and a flat surface 68 intermediate the converging surface 54 and the diverging surface 64.

During operation of the power transmission in which the synchronizer is incorporated, torque reversals on the ratio gear 32 will occur. One example, when the torque reversals will occur is during a transition from driving to coasting of the vehicle. As is well-known, the gear teeth 70 formed on the ratio gear 32 are helical. Helical teeth are utilized in power transmissions to reduce the noise which might otherwise be generated by intermeshing teeth. The helix angle of the teeth 70, however, causes a fore and aft movement of the ratio gear along the shaft 10 when a torque reversal occurs. The bearings in the transmission prevent large longitudinal displacements of the ratio gear relative to the sleeve movement 14, however, due to manufacturing considerations, there is a slight fore and aft movement which occurs.

If the spline teeth are designed in the conventional manner, the surfaces 52 and 60 will be in contact and simultaneously, the surfaces 50 and 62 will be in contact. Thus, in conventional spline arrangements, fore and aft movement of the ratio gear is transmitted to the sleeve via the splines. The slight fore and aft movement of the sleeve 14 is transmitted through the yoke 22 and rod 24 to the manual shift lever, not shown, which is disposed within the passenger compartment of the vehicle. This fore and aft movement is not detrimental, but from a pleasability standpoint, it is not desirable. The flat surfaces 66 and 68 permit limited longitudinal movement of the ratio gear relative to the sleeve 14 without transmitting said longitudinal movement via the sleeve 14 to the operator controls. This results in smoother transmission operation.

The surfaces 40 and 42 as seen in the drawings, intersect an apex and are considered to be diverging from the apex along the longitudinal axis of the spline teeth. The surfaces 52 and 54 intersect the surfaces 40 and 42, respectively, and are considered to be converging in the direction of the longitudinal axis of the spline teeth. The surfaces 62 and 64 can be substantially parallel to the surfaces 40 and 42 respectively and are considered to be diverging along the longitudinal axis of the spline teeth. If the travel is limited by other components such as the shift linkage, the surfaces 62 and 64 can have other angular dispositions. The same description can be made for surfaces 48 and 50, and 58 and 60 of the spline teeth 30 which are formed on the ratio gear 32. The terms diverging and converging are used to describe the respective disposition of these teeth so as to provide some definition and consistency in discussing their relationships.

The embodiments of the invention in which an exclusive property or privilege is claimed are defined as follows:

1. A synchronizer clutch for use in a power transmission having a ratio gear rotatably disposed on a shaft, said ratio gear being longitudinally movable upon a torque reversal through the transmission, said synchronizer clutch comprising: synchronizer teeth formed on said ratio gear; a hub member drivingly connected to said shaft; a sleeve member slidably disposed on said hub member for longitudinal movement thereon and having means for continuously drivingly connecting said hub member and said sleeve member for unitary rotation; synchronizer sleeve teeth formed on said sleeve member and being axially aligned for selective mating with said synchronizer teeth; and means for moving said sleeve member longitudinally on said hub member to effect mating of said synchronizer sleeve teeth and said synchronizer teeth, said synchronizer teeth each having diverging oblique surfaces facing said sleeve member and converging oblique surfaces facing opposite said diverging surfaces and being immediately adjacent and intersecting therewith, said synchronizer sleeve teeth each having leading diverging oblique surfaces facing said diverging surfaces of said synchronizer teeth, converging oblique surfaces facing opposite said leading diverging surfaces and being adjacent thereto and intersecting therewith, and tooth flat means extending longitudinally from said converging oblique surfaces on said synchronizer sleeve teeth for accommodating relative longitudinal movement between said ratio gear and said sleeve member when said sleeve teeth and said synchronizer teeth are in interdigital mating relation and for preventing longitudinal movement of said ratio gear from being transmitted to said sleeve member.

2. A synchronizer clutch for use in a transmission having a ratio gear rotatably disposed on a shaft, said ratio gear being longitudinally movable upon a torque reversal through the transmission, said synchronizer clutch comprising: synchronizer spline teeth formed on said ratio gear; a hub member drivingly connected to said shaft and having spline teeth formed thereon; a sleeve member slidably disposed on said hub member for longitudinal movement thereon and having spline teeth continuously drivingly connecting said spline teeth on said hub member for unitary rotation therewith; said spline teeth formed on said sleeve member being axially alignable for selective mating with said synchronizer spline teeth; and means for moving said sleeve member longitudinally on said hub member to effect mating of said spline teeth on said sleeve member and said synchronizer spline teeth, said synchronizer spline teeth each having diverging oblique surfaces facing said sleeve member spline teeth and converging oblique surfaces facing opposite said diverging surfaces and being immediately adjacent and intersecting therewith, said spline teeth on said sleeve member each having leading diverging oblique surfaces facing said diverging surfaces of said synchronizer spline teeth, converging oblique surfaces facing opposite said leading diverging surfaces and being adjacent thereto and intersecting therewith, trailing diverging oblique surfaces facing said converging oblique surfaces of said spline teeth of said sleeve member and being spaced longitudinally therefrom, and tooth flat means disposed between said converging oblique surfaces and said trailing diverging oblique surfaces on said spline teeth of said sleeve member for accommodating relative longitudinal movement between said ratio gear and said sleeve member when said spline teeth and said synchronizer spline teeth are in interdigital mating relation and for preventing longitudinal movement of said ratio gear from being transmitted to said sleeve member.

* * * * *